United States Patent
Furetta et al.

(10) Patent No.: US 7,755,977 B2
(45) Date of Patent: Jul. 13, 2010

(54) DISPLAY UNIT WITH DECORATIVE EFFECTS FOR A PORTABLE INSTRUMENT, SUCH AS A WATCH

(75) Inventors: Allessandra Furetta, Grenchen (CH); Christian Verdon, Boussens (CH); Naci Basturk, Enges (CH)

(73) Assignee: Montres Rado S.A., Lengnau (CH)

( * ) Notice: Subject to any disclaimer, the term of this patent is extended or adjusted under 35 U.S.C. 154(b) by 901 days.

(21) Appl. No.: 11/551,320

(22) Filed: Oct. 20, 2006

(65) Prior Publication Data

US 2007/0109918 A1 May 17, 2007

(30) Foreign Application Priority Data

Oct. 28, 2005 (EP) .................................. 05110159

(51) Int. Cl.
*G04C 17/00* (2006.01)

(52) U.S. Cl. ..................... 368/241; 368/223; 349/56

(58) Field of Classification Search .................. 368/223, 368/241, 79; 349/56

See application file for complete search history.

(56) References Cited

U.S. PATENT DOCUMENTS 4,775,964 A * 10/1988 Alessio et al. ................. 368/67
5,892,455 A * 4/1999 Matsumoto ................ 340/7.55

(Continued)

FOREIGN PATENT DOCUMENTS

EP 0 078 237 5/1983

(Continued)

OTHER PUBLICATIONS

Austrian Search Report issued in corresponding Singapore patent application No. 200606955-3, completed Dec. 17, 2007.

(Continued)

*Primary Examiner*—Vit W Miska
*Assistant Examiner*—Sean Kayes
(74) *Attorney, Agent, or Firm*—Griffin & Szipl, P.C.

(57) ABSTRACT

The display unit (2) equips a portable instrument, such as a wristwatch (1) with hands (13, 14, 15) for indicating the time. The unit comprises at least one display cell (4) which comprises a transparent front substrate (41) having first transparent electrodes (45) on an interior face, a transparent rear substrate (42) having at least one transparent second electrode (46) on an interior face and a fixing frame (43) for the two substrates in order to define a closed space between the substrates. A substance (44), the optical or physical properties of which can be modified between the electrodes which are activated by a difference of potentials applied via control means, occupies the closed space between the first and second electrodes. Via the action of the control means, the display cell (4) makes it possible to display information, for example temporal information. The display unit (2) comprises also a plurality of transparent or semi-transparent stones which are supported on or in a transparent or semi-transparent support (3). The support is disposed on a front visible face of the display cell or alternatively on a rear face of the display cell in order to combine the information of the cell in a first display state with light refraction through visible rigid elements and/or light reflection on or in the visible rigid elements.

15 Claims, 4 Drawing Sheets

U.S. PATENT DOCUMENTS

| | | | |
|---|---|---|---|
| 6,004,026 A * | 12/1999 | Slowinski | 368/282 |
| 7,050,358 B2 * | 5/2006 | Garay et al. | 368/67 |
| 2002/0045028 A1 | 4/2002 | Teshima et al. | |
| 2004/0257496 A1 | 12/2004 | Sonoda et al. | |

FOREIGN PATENT DOCUMENTS

| | | |
|---|---|---|
| EP | 1 566 685 | 8/2005 |
| GB | 653078 | 5/1951 |
| GB | 1 599 556 | 1/1980 |
| GB | 2 276 071 | 9/1994 |
| JP | 57011320 | 1/1982 |
| JP | 20011318179 | 11/2001 |
| WO | 99/32945 | 7/1999 |

OTHER PUBLICATIONS

European Search Report in corresponding application No. EP 05 11 0159 completed May 10, 2006.

* cited by examiner

DISPLAY UNIT WITH DECORATIVE EFFECTS FOR A PORTABLE INSTRUMENT, SUCH AS A WATCH

This application claims priority from European Patent Application No. 05110159.0 filed Oct. 28, 2005, the entire disclosure of which is incorporated herein by reference

FIELD OF THE INVENTION

The present invention relates to a display unit with decorative effects for a portable instrument, such as a watch. The unit comprises at least one display cell and control means which are connected to at least two electrodes of the cell. The control means are able to provide electrical signals, in particular a difference of potentials, to the electrodes in order to place the cell in a first state for displaying information. In this first display state, the display cell is able to display information which can be a series of characters, an image or temporal information. In the absence of electrical signals, the display cell is in a second state, termed at rest. In this second state the display cell can be transparent or opaque.

The present invention relates likewise to a watch, such as a wristwatch which comprises a display unit.

BACKGROUND OF THE INVENTION

In the watchmaking field, it is often provided to decorate the casing or the bezel or the dial of a watch with decorative elements. These decorative elements have no function other than to improve the aesthetics of the watch. Precious stones can be disposed for example on the bezel or the casing of the deluxe watch in order to decorate it.

SUMMARY OF THE INVENTION

The main object of the present invention is to provide a display unit for a portable instrument, such as a watch, which improves the quality and the manner of displaying information and which has decorative effects in combination with the displayed information.

To this end, the subject of the present invention is a display unit cited above which is characterised in that it includes furthermore a plurality of transparent or semi-transparent rigid elements which ere supported on or in a support, said support being disposed on a front face of vision of the display cell or alternatively on a rear face of the display cell in order to combine information of the cell in its first display state with light refraction through visible rigid elements and/or light reflection on or in the visible rigid elements.

An advantage of the display unit according to the invention is that it makes it possible to provide a better view of the displayed information thanks to transparent or semi-transparent rigid elements which can be cut precious stones. The light rays of the ambient light or from a backlighting device under the cell and the support are reflected, refracted or diffracted by the stones, which makes it easier to read the information while providing the instrument equipped with the display unit with an aesthetic and decorative effect. This instrument is preferably a wristwatch or a pocket watch.

Advantageously, the support with transparent or semi-transparent stones is placed under a transparent rear substrate of the display cell. As a result in the case of a display cell with negative contrast, some of the precious stones appear through portions of the cell which have become transparent during the display of information, for example temporal information. In a resting state of the cell, the precious stones are concealed by the opaque cell. For preference, the cell in its second state, termed at rest, is opaque with a dark colour, for example black, or totally reflecting with the appearance of a mirror.

Advantageously, the display cell comprises a plurality of transparent first electrodes which are configured in digits, each formed by display segments on an interior face of a transparent front substrate, at least one transparent second electrode on an interior face of a transparent rear substrate, and a fixing frame for the two substrates in order to define a closed space between the substrates where the electrodes and a substance are situated. The optical or physical properties of the substance are modified between at least one first electrode and the second electrode which are activated by a difference of potentials applied via the control means. All the rigid elements of the support placed at the back of the display cell are arranged also with digits opposite the digits of the first electrodes. At least one rigid element, i.e. at least one precious stone, is totally visible through the active segment when information is displayed by a display cell with negative contrast.

Advantageously, the display cell can comprise electrodes provided in the form of a matrix and connected to control means. As a function of the addressing of the electrodes by the control means, temporal information in the form of hands of a watch can be presented. In the first display state of a cell with negative contrast for presentation of the information, a plurality of precious stones of the support placed on the back of the cell becomes visible. These stones can be rubies, sapphires, emeralds, moonstones, diamonds or other precious stones. These stones can likewise be synthetic stones, such as monocrystalline cubic zirconium oxide stones. As a result, a plurality of types of stones of equal or different size can decorate the support in order to give different colours through the information of the cell and a diffraction or particular reflection of the light.

Advantageously, a backlighting device is placed under the display cell and the transparent support with transparent rigid elements. In this way, some of the rigid elements in the form of transparent or semi-transparent stones are illuminated and visible via transparency of some parts of the cell in the field of vision of the display unit. The size of the stones can be optimised in order to allow a maximum amount of light to pass through. This size can be of a brilliant or baguette type or of other multi-faceted types.

In the case where the support for transparent or semi-transparent rigid elements is placed above the display cell, preferably with positive contrast, the information displayed by the cell is of a dark colour, for example black. The parts around the displayed information can appear in a light colour, for example white or silver in order to contrast well with the information read through the rigid elements of the support in daylight or with the help of the backlighting device.

BRIEF DESCRIPTION OF THE DRAWINGS

The aims, advantages and features of the display unit will emerge better in the following description of embodiments of the invention which are non-limiting, in conjunction with the drawings in which.

DETAILED DESCRIPTION OF THE INVENTION

In the following description, reference is made only to a display unit equipping a watch, for example a wristwatch as a portable instrument. Any conventional parts of the display unit, which are part of the general knowledge of the person skilled in the art, will only be explained summarily in the following description. However, it is very clear that such a display unit can equip other portable instruments, such as portable telephones, electronic organisers or other instruments.

Figure 1:
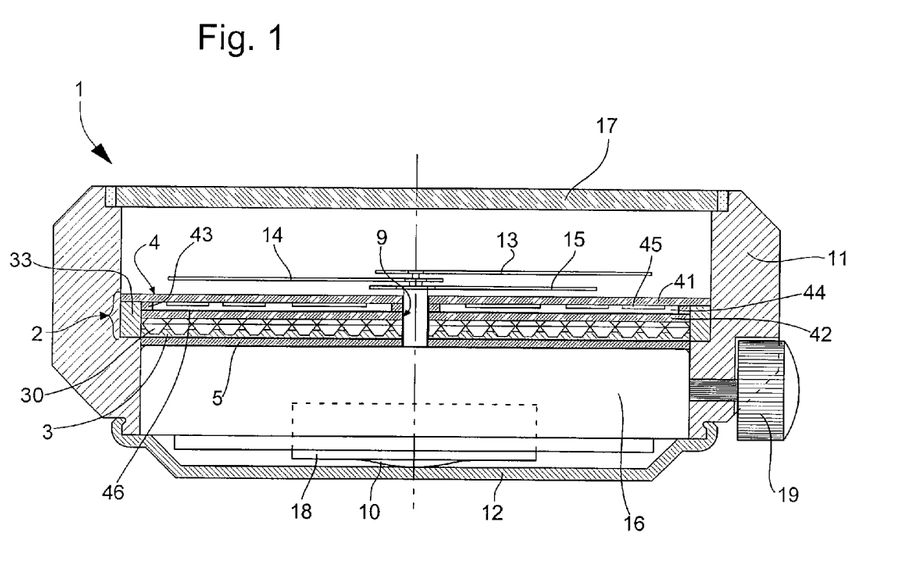
FIGS. 1 and 2 represent a view in diametral section and a view from above of a first embodiment of a display unit according to the invention equipping a watch.
Figure 2:
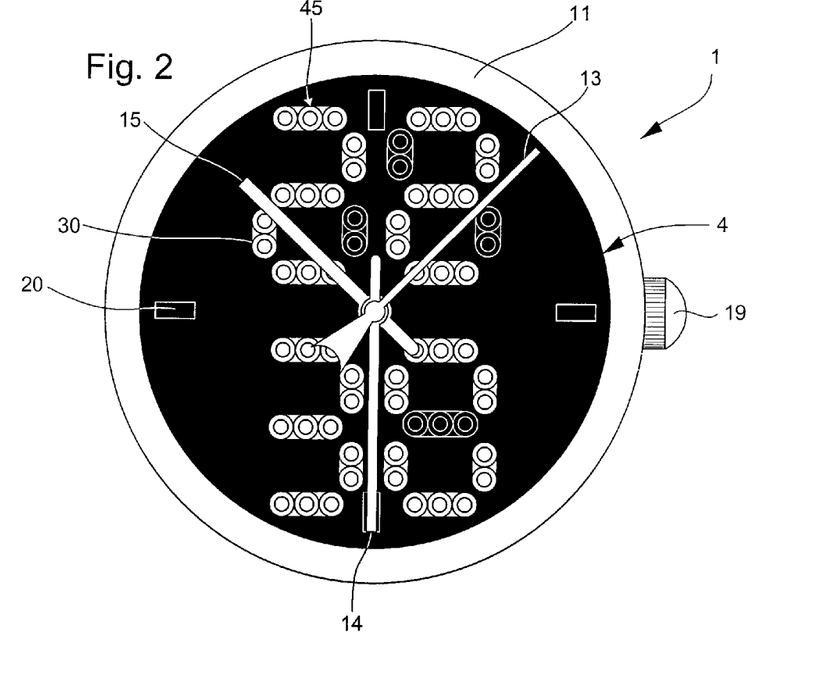

With reference to FIGS. 1 and 2, there can be observed a first embodiment of a display unit 2 according to the invention in a watch 1, a part of the display unit playing the role of watch dial. This watch 1 comprises as standard a casing 11 provided with a back 12 in which there are disposed an electronic watch movement 16 and a battery 18 which is supported on the back 12 by means of a contact spring 10. The casing 11 is likewise closed in a standard manner by a glass 17 covering the entirety of the dial and a crown button 19 of the casing makes it possible to control in particular the time of the watch or the date.

The movement 16 comprises timekeeping electronic circuits associated via a control circuit with a drive device (not shown) of a second hand 13, a minute hand 14 and an hour hand 15. These hands move above a dial formed in part by a display cell 4 of the display unit 2. In order to do this, the axis of the hands passes through an opening 9 provided in the centre of the display unit 2 in order to be driven by the device for driving the watch movement 16.

The display unit 2 according to the invention comprises a display cell 4 with negative contrast, a transparent or semi-transparent support 3 forming a grid supporting a plurality of transparent or semi-transparent rigid elements 30, the support being disposed below the display cell 4, and a backlighting device 5 under the support with rigid elements 30. The backlighting device can be an electroluminescent foil 5 or a light guide combined with an electroluminescent diode which is laterally near the casing 11 of the watch 1. This backlighting device makes it possible to view information of the display cell in the dark by passing through the visible rigid elements 30 of the support 3.

It can be envisaged likewise to use a front lighting device placed above the cell 4 and/or the support 3 for transparent or semi-transparent rigid elements 30. This front lighting device can be composed for example of a standard (LED) or organic (OLED) electroluminescent diode which is disposed near the watch casing 11.

The display cell 4 comprises a front transparent substrate 41 of vision, i.e. in the field of vision of the information displayed for a user, a transparent rear substrate 42, a spacing and fixing frame 43 for the two substrates and a substance 44 occupying the closed space between the substrates. The front substrate 41 carries, on an interior face, transparent first electrodes 45 configured in the form of digits, which are each formed by 7 display segments which can be of a width and length adapted to the dimension of the rigid elements 30 which are used. The width can be less than 1 mm, for example of the order of 0.8 mm or less, but can also be chosen likewise greater than 1 mm, for example of the order of 1.5 mm or greater.

The rear substrate 42 carries, on an interior face, a transparent second electrode 46 opposite all the first electrodes 45. The substance between the first and second electrodes is chosen such that its chemical or physical properties are modified between first and second electrodes which are activated by electrical signals, for example a difference of potentials provided via control means, not shown, from the watch movement 16. These control means are connected electrically to the display cell 4 by means of a connector 33. Of course, the front and rear substrates can likewise carry polarisers, not shown.

Via the configuration in the form of digits of the first electrodes 45, the display cell 4 in conjunction with rigid transparent elements 30 of the support 3 makes it possible to provide temporal digital information, for example the time of day, as shown in FIG. 2. The first non-activated electrodes 45 of the digits are shown in a dark colour and also the non-visible rigid elements below these first electrodes. In daylight, horary information with the help of hands, and also digital information about the time can be provided for the user of the watch 1. The digital display can be combined or not with hands.

In this first embodiment shown in FIGS. 1 and 2, the display cell 4 has negative contrast, and the front substrate 41 of the display cell 4 carries index hours 20 which are visible in FIG. 2. In the second state of rest of the display cell, the colour is opaque with a dark colour and solely analogue information about the time by means of the hands 13, 14 and 15, and the indices 20 is provided for the user of the watch 1.

The display cell can be a liquid crystal cell of the nematic helical type (TN or STN), of the cholesteric texture type (CT), a bistable liquid crystal cell (ZBD, Nemoptic or others), an electrolytic cell, a bistable electrochromic cell, an electrophoretic cell, an electrowetting cell, a polymer-dispersed cell (PDLC), an in-plane switching cell (IPS), an interference modulation cell (IMOD), an organic electroluminescent diode cell (OLED), a cell of the micro-electromechanical type (MEMS) or other cells which are able to present a transparent state and an opaque state. Preferably for the combination of the support with rigid elements with the display cell for reading information, the most transparent display types must if possible be selected. For this, it can be preferable to choose a liquid crystal display cell of the cholesteric texture type which is more transmissive (70-80%) than the other cells. By way of comparison, a liquid crystal display cell of the nematic type with two polarisers has a transmission of the order of 40%. For more information on the subject of the various types of cells, the reader may refer to the patent application WO 99/32945 or the European Patent EP 0 078 237 B1 in the name of the applicant.

In the case of a display cell 4 of the organic electroluminescent diode type (OLED), it is not necessary to provide the display unit with a backlighting device because each segment of activated information produces light which passes through one or more stones disposed above said cell. Each activated segment of this cell can be controlled by a weak control voltage. Various colours of the illuminated segments of this cell can likewise be envisaged. This OLED display cell can be produced with a small thickness which makes it possible to equip a wristwatch with a small thickness.

It should be noted that the display cell 4 of the first embodiment can also have positive contrast. In this case, in the second state at rest of the display cell, all the rigid elements 30 of the support 3 are visible in the field of vision of the display unit 2.

The rigid elements 30 of the support 3 of the display unit 2 according to the invention are preferably precious stones, such as cut diamonds, or synthetic stones, such as monocrystalline cubic zirconium oxide stones. These precious stones can be set or fixed on or in the support 3 or be integrated into a transparent support, for example of plastic material. The precious stones can likewise be fixed to the support by passing right through it. In this case it is not absolutely necessary for the support to be transparent if the precious stones are transparent or semi-transparent.

The precious stones 30 can be disposed close to each other over the entire surface of the support 3. The useful width of each precious stone can be chosen less than 1 mm, for example of the order of 0.8 mm (0.01 carat), for example as a function of the chosen width of a digit segment. The space separating each precious stone is less than the width of the stones, in particular less than 0.5 mm, for example 0.15 mm. Of course, it is entirely conceivable to provide the support with precious stones of a size greater than 1 mm, for example of the order of 1.5 mm or greater.

Several sorts of stones of different colours can decorate the support. The precious stones 30 can be rubies, sapphires, emeralds, moonstones, diamonds or other precious stones. Each stone can be cut into two substantially truncated parts from the widest intermediate zone or have several cut facets. The dimension of the stones disposed on the support can be different. Stones of different colours or sizes can be selected for each digit of information to be displayed by the display cell 4. The size of the stones can be chosen from types such as brilliant, baguette or other multi-faceted types in order to provide the visible stones with a luminous sparkle.

In an economy measure for the precious stones, it can be envisaged to place and support only precious stones 30 of the support 3 below each segment of the digits of the transparent first electrodes 45. The dimension of the segments and of the precious stones is chosen so as to see at least one precious stone, preferably at least two precious stones, per activated segment (transparent) of the display cell. In this scenario, it is possible to observe entirely 2 or 3 precious stones through some of the transparent segments.

Figure 3:
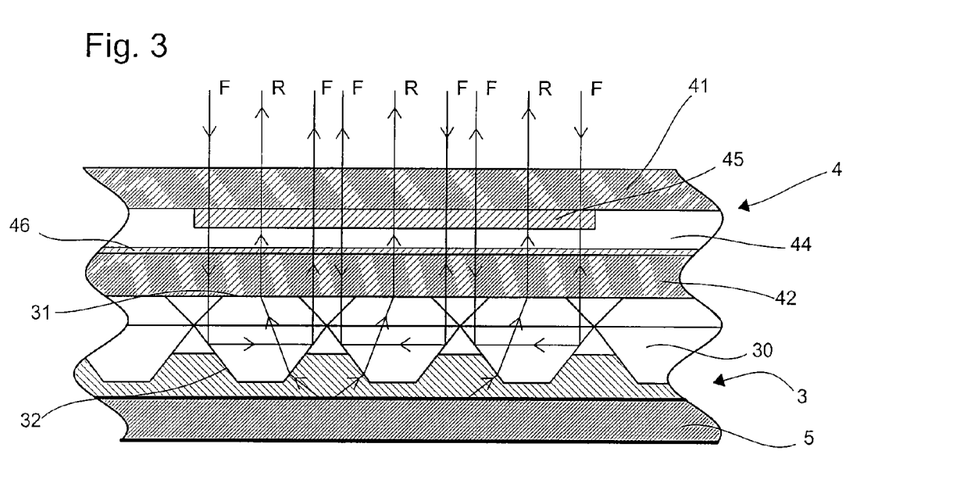
FIG. 3 represents an enlarged view in section of a portion of the display unit according to the invention showing the reflection, refraction or diffraction of light beams on and through transparent or semi-transparent stones of the support.

As can be noticed better in FIG. 3 from an enlarged portion of the display unit, each stone can be cut so as to present at least one upper facet 31 which is parallel to the rear substrate 42 of the display cell 4. As a result in daylight in the first display state of the display cell, the light F penetrates through the upper facet 31 of each visible stone through each transparent segment which is representative of the information to be displayed. This light F can be reflected by lower facets 32 of each visible stone, given the difference in refractive index between the precious stone and the material of the support for example or air in the case where the stones are set in a grid as support. This reflected light on the lower facets can re-emerge for example via the upper facet of the precious stone, giving a luminous sparkle to the displayed information.

As a backlighting device is likewise provided in this first embodiment, the light R produced by the device likewise passes through the visible precious stones into the field of vision of the information. As a result according to the invention, it is possible to combine information from the cell in its first display state with the light refraction through visible precious stones and/or the light reflection on or in the visible precious stones. Colour effects can likewise appear by diffraction of daylight through the visible precious stones, which can improve the view of the information whilst conferring an aesthetic effect to the watch.

Very particular attention must be paid to the size of each precious stone (diamond) and the placing thereof on the support in order that the light produced by the backlighting device passes well through the visible stones for good readability of the information in dark places or at night.

Figure 4:
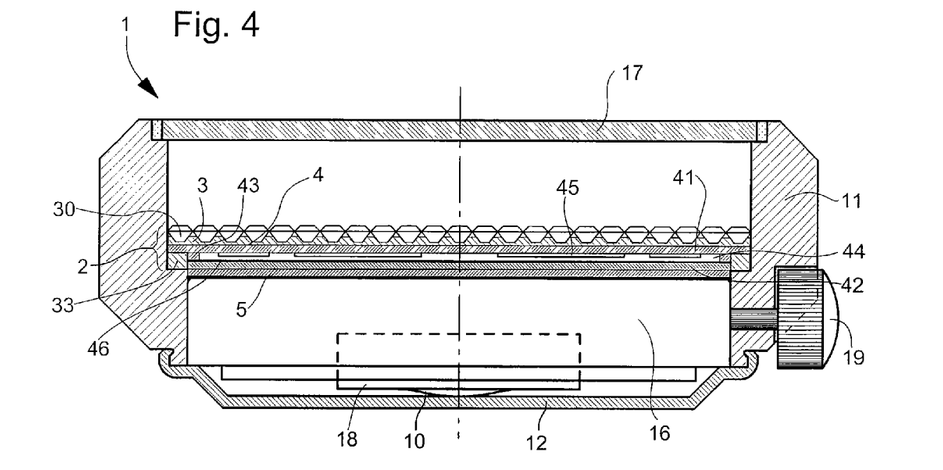
FIGS. 4 and 5 represent a view in diametral section and a view from above of a second embodiment of a display unit according to the invention equipping a watch with the time indicated in a digital manner.
Figure 5:
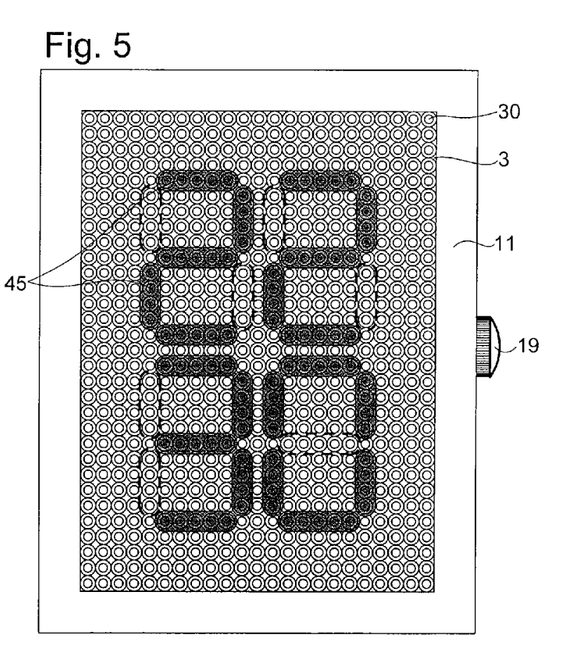

In FIGS. 4 and 5, a second embodiment of the display unit 2, equipping a watch 1, the casing 11 of which is of a rectangular shape in top view, is presented. It should be noted that all the elements of the watch 1 which comprises the display unit 2 according to the invention described hereafter bear identical reference numbers to those presented in FIGS. 1 and 2. By way of simplification, the description of each element will not therefore be repeated for FIGS. 4 and 5.

The essential difference of this second embodiment resides in the fact that the support 3 for the precious stones 30 is this time disposed above the display cell 4. The support with the precious stones forms the directly visible part of the dial of the watch. As a result, it is preferable that the stones 30 decorate all the support 3 up to the interior edge of the casing 11. The space between each stone is less than the width of each precious stone.

The display cell 4 preferably has positive contrast in order to contrast better the information displayed through the network of precious stones 30 on the support. Furthermore a backlighting device 5 can be disposed under the display cell 4 in order to illuminate the precious stones through the transparent parts of the display cell.

Figure 6:
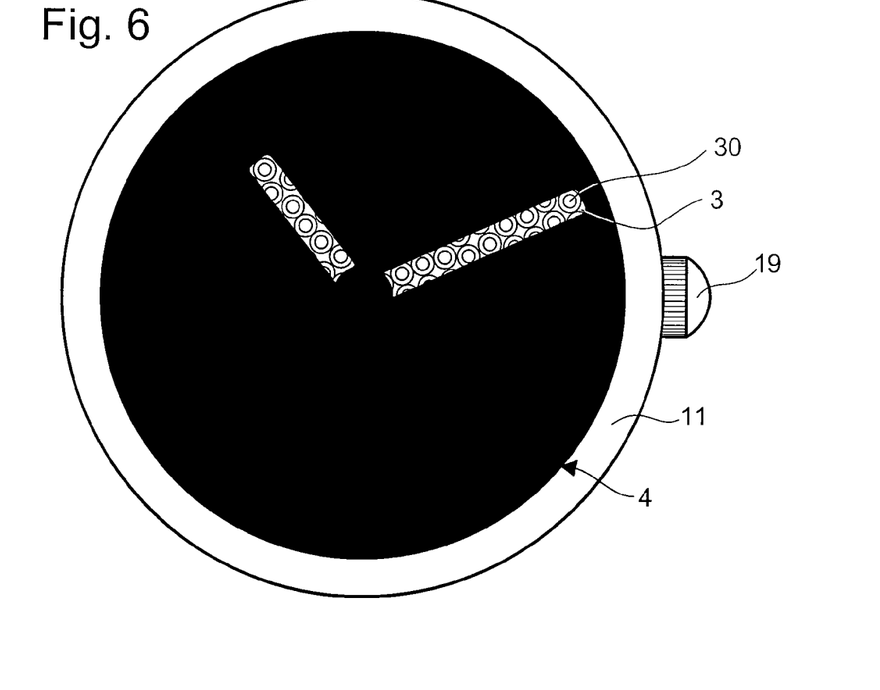
FIG. 6 represents a view from above of a third embodiment of a display unit according to the invention indicating the time in an analogue manner with the help of a display cell with negative contrast in a watch.
Figure 7:
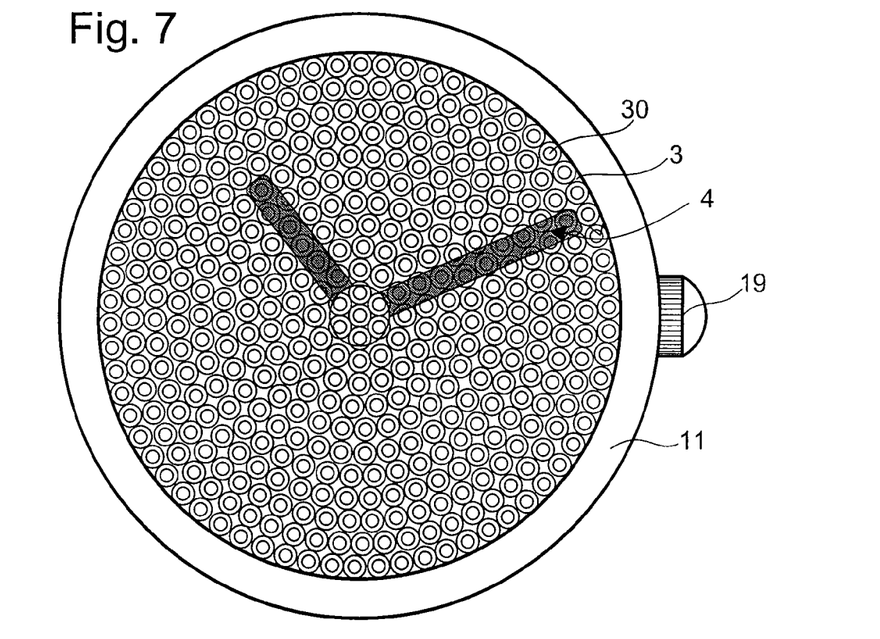
FIG. 7 represents a view from above of a fourth embodiment of a display unit according to the invention indicating the time in an analogue manner with the help of a display cell with positive contrast in a watch.

In FIGS. 6 and 7 a view from above is presented (field of vision) of a third and a fourth embodiment of the display unit equipping a watch 1. The casing 11 of the watch is of an oval or circular form as seen from above. All the elements of the watch 1, which comprises the display unit 2 according to the invention, those described hereafter bear identical reference numbers to those presented in FIGS. 1 to 5. By way of simplification the description of each element will not be repeated for FIGS. 6 and 7.

The essential difference in these third and fourth represented embodiments resides in the fact that the display cell is of the matrix type. It comprises a plurality of lines of transparent first electrodes on an interior face of a transparent front substrate, and a plurality of lines of second electrodes on an interior face of a transparent rear substrate. The lines of first electrodes are disposed perpendicularly to the lines of second electrodes. Hence the control means in a first display state of the display cell address, by multiplexing and selectively, lines of first and second electrodes in order to display information. The information displayed by the cell in its first display state represents horary information in the form of hands of a watch.

In FIG. 6, the display cell 4 has negative contrast with the support carrying precious stones 30 over its entire surface, which is placed at the back of the cell. The horary indication appears clearly on a dark background with view of the precious stones through the hands of the cell.

In FIG. 7 a display cell 4 with positive contrast is used with the support carrying precious stones 30 over its entire surface, placed in front of the cell. In this case, the horary indication through the support with precious stones is of a dark colour, for example black, on a light background.

Of course a backlighting device can be used for the third and fourth embodiments of the display unit in order to facilitate reading of the information in the dark. However, it can likewise be conceivable that the backlighting device is replaced by a reflective layer, such as a mirror or a layer of a white colour.

Other embodiment variants of the display unit with the help of a double liquid crystal display cell placed under the watch glass can likewise be conceived as shown in the patent application WO 99/32945 which is taken here as reference document. The support for precious stones is disposed in this case between the first display cell for information and the second cell serving as optic valve. If the two display cells are transparent, an indication of the time by means of hands of the watch below the cells can be seen through the precious stone support.

From the description which has just been provided, multiple embodiment variants of the display unit can be conceived by the person skilled in the art without going beyond the scope of the invention defined by the claims. The display cell, and also the precious stone support can be curved in the form of a cylindrical portion in order to equip a watch, the casing of which is likewise curved. The front and rear substrates of the display cell can be flexible. The information displayed by the display unit can be of the alphanumeric type, or even an image or a motif. The electrodes of the cell can be connected by a resistive element or heating body in order to heat the substance locally in order to modify its optical properties, for example by modification of colour. The display cell can likewise be a cell of the electro-micromechanical type in which the electrodes control the opening or closure of opaque shutters in order to display information. This display cell can likewise comprise an opaque substance which can be momentarily displaced by position as for a micropump in order to place the cell in its first display state for information. The display cell can be placed just below the glass of an analogue watch whilst the precious stone support is disposed on the dial below the hands of the watch.

What is claimed is:

1. A display unit for a portable instrument, the unit comprising:
   (a) a plurality of transparent or semi-transparent rigid elements supported on or in a support;
   (b) at least one display cell; and
   (c) control means connected to at least two electrodes of the cell, wherein the control means provide electrical signals to the electrodes in order to place the cell in a first state for displaying information, and in the absence of electrical signals the cell is in a second state at rest,
   wherein the transparent or semi-transparent rigid elements are precious stones or synthetic stones which comprise a plurality of cut facets,
   wherein the stones are supported on or in the support and disposed on a rear face of the display cell in order to combine information of the cell in the first display state
   (1) with light refraction through the visible cut stones, or
   (2) with light reflection on or in the visible cut stones, or
   (3) with light refraction through the visible cut stones and with light reflection on or in the visible cut stones,
   wherein at least one upper flat facet of each stone is disposed parallel to the front face or to the rear face of the display cell, and
   wherein lower facets of each cut stone are inclined by an angle less than 90° relative to the front face or to the rear face in order to reflect a part of the light passing through one or more of the visible stones.

2. The display unit according to claim 1, wherein the precious stones are rubies, sapphires, emeralds, moonstones or diamonds, and wherein the synthetic stones are monocrystalline cubic zirconium oxide stones.

3. The display unit according to claim 1, wherein the dimension of each precious stone placed in or on the support is the same.

4. The display unit according to claim 1, wherein the cut stones are fixed on or in a transparent or semi-transparent support, and wherein the cut stones are of a different colour and/or of a different size.

5. The display unit according to claim 1, wherein the display cell comprises a plurality of transparent first electrodes which are configured in digits, each formed by display segments on an interior face of a transparent front substrate, at least one transparent second electrode on an interior face of a transparent rear substrate, and a fixing frame for the two substrates in order to define a closed space between the substrates where the electrodes and a substance are situated, the optical or physical properties of which are modified between at least one first electrode and the second electrode which are activated by a difference of potentials applied via the control means, and wherein the cut stone support is placed on an exterior face of the front substrate or alternatively on an exterior face of the rear substrate.

6. The display unit according to claim 5, in which the support for the cut stones is disposed on the side of the exterior face of the rear substrate of the display cell with negative contrast, wherein all the cut stones of the support are disposed on the support in the form of digits opposite first electrodes which are configured in digits, and wherein the form and the dimension of each segment of the first electrodes are chosen for perception entirely or partially of at least two cut stones per activated segment in the first state for displaying information of the display cell.

7. The display unit according to claim 1, wherein the display cell of the matrix type comprises a plurality of lines of transparent first electrodes on an interior face of a transparent front substrate, a plurality of lines of transparent second electrodes on an interior face of a transparent rear substrate which are disposed perpendicularly to the lines of first electrodes, and a fixing frame for the two substrates in order to define a closed space between the substrates where the electrodes and a substance are situated, the optical or physical properties of which are modified by a difference of potentials applied between the first and second electrodes which are selectively addressed by the control means in a first display state of the display cell in order to display information, and wherein the support of the cut stones is placed on an exterior face of the front substrate or alternatively on an exterior face of the rear substrate.

8. The display unit according to claim 1 in which the display cell is a liquid crystal display cell or an electrochromic display cell or an electrolytic display cell or an electrowetting display cell or a polymer-dispersed cell or a cell of the micro-electromechanical type or an interference modulation cell or an organic electroluminescent diode cell, wherein the information displayed by the cell in its first display state represents horary information in the form of hands of a watch.

9. The display unit according to claim 1, wherein a backlighting device is disposed below the cell and the support of the cut stones in order to illuminate visible cut stones during reading of the information in the first state of the display cell.

10. The display unit according to claim 9, wherein the backlighting device comprises an electroluminescent foil or a standard or organic electroluminescent diode.

11. The display unit according to claim 1, wherein a front lighting device is disposed above the cell and the support of the cut stones in order to illuminate visible cut stones in particular during reading of the information in the first state of the display cell.

12. A watch of the wristwatch type in a casing closed by a glass, comprising the display unit according to claim 1.

13. The watch according to claim 12, wherein the display unit comprises in part the dial of the watch, and wherein hands for indicating the time which are driven by a drive device of a watch movement pass through the support of the cut stones and the display cell for indicating the time.

14. The watch according to claim 12, wherein hands for indicating the time which are driven by a device for driving a watch movement pass through the support of the cut stones, which forms a part of the watch dial, and wherein the display cell for indicating the time is disposed above the hands of the watch and below the glass of the watch.

15. The display unit according to claim 11, wherein the front lighting device comprises an electroluminescent foil or a standard or organic electroluminescent diode.

\* \* \* \* \*